April 27, 1954     I. M. ARCHER     2,676,718
MACHINE FOR EMPTYING BREAD AND THE LIKE FROM BAKING PANS
Filed Sept. 22, 1950     7 Sheets-Sheet 1

INVENTOR.
Irving M. Archer
BY
Fishburn & Mullendore
ATTORNEYS

April 27, 1954     I. M. ARCHER     2,676,718
MACHINE FOR EMPTYING BREAD AND THE LIKE FROM BAKING PANS
Filed Sept. 22, 1950     7 Sheets-Sheet 2

INVENTOR.
Irving M. Archer
BY
Fishburn & Mullendore
ATTORNEYS

April 27, 1954   I. M. ARCHER   2,676,718
MACHINE FOR EMPTYING BREAD AND THE LIKE FROM BAKING PANS
Filed Sept. 22, 1950   7 Sheets-Sheet 4

INVENTOR.
Irving M. Archer
BY
Fishburn † Mullendore
ATTORNEYS

April 27, 1954     I. M. ARCHER     2,676,718
MACHINE FOR EMPTYING BREAD AND THE LIKE FROM BAKING PANS
Filed Sept. 22, 1950     7 Sheets-Sheet 5
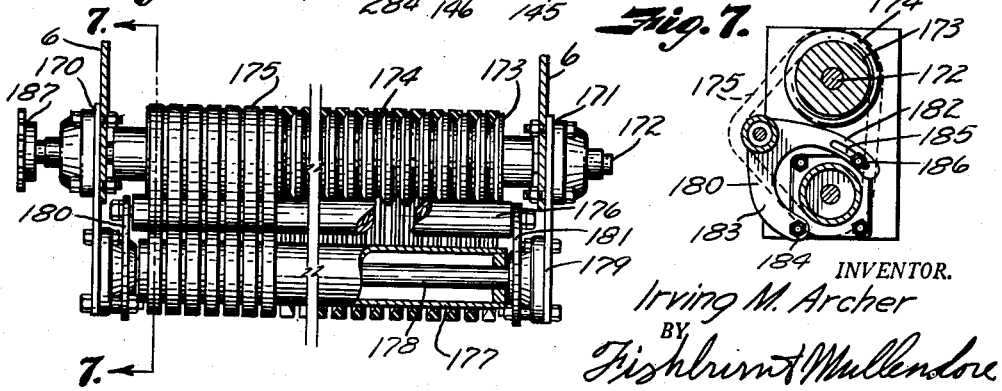
INVENTOR.
Irving M. Archer
BY
Fishburn & Mullendore
ATTORNEYS April 27, 1954  I. M. ARCHER  2,676,718
MACHINE FOR EMPTYING BREAD AND THE LIKE FROM BAKING PANS
Filed Sept. 22, 1950  7 Sheets-Sheet 6

INVENTOR.
Irving M. Archer
BY
Fishburn & Mullendore
ATTORNEYS

April 27, 1954     I. M. ARCHER     2,676,718
MACHINE FOR EMPTYING BREAD AND THE LIKE FROM BAKING PANS
Filed Sept. 22, 1950     7 Sheets-Sheet 7
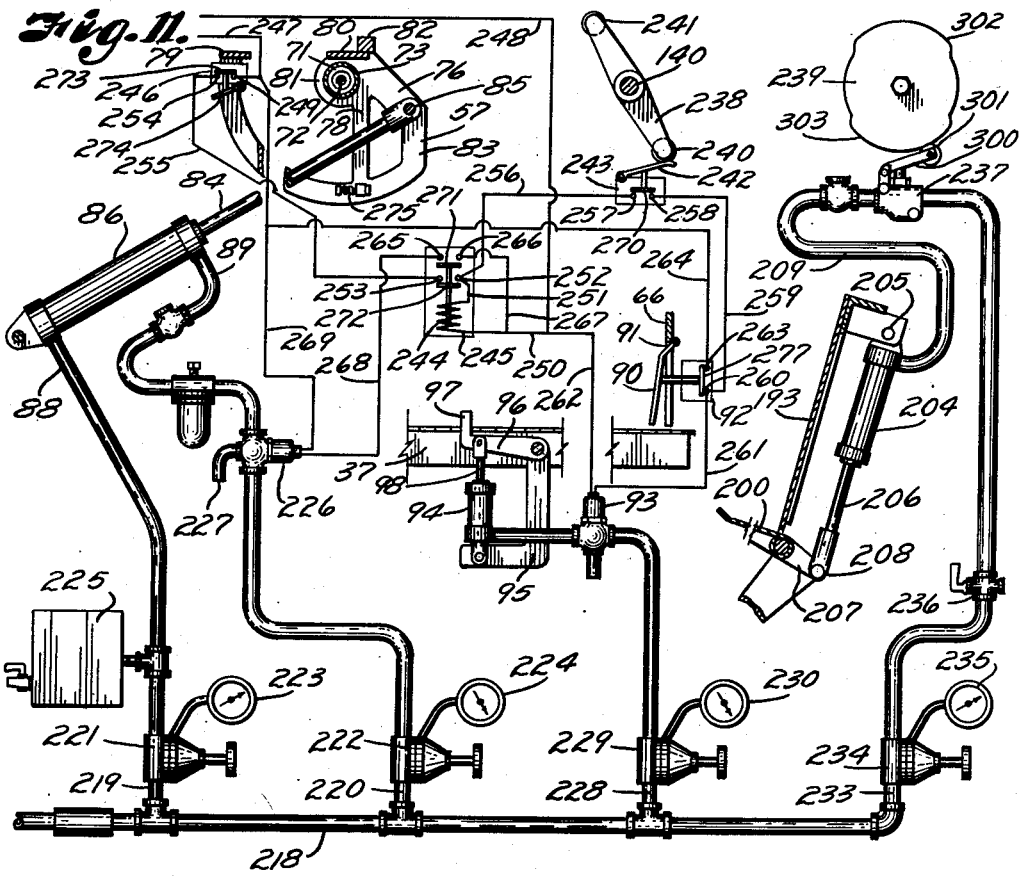
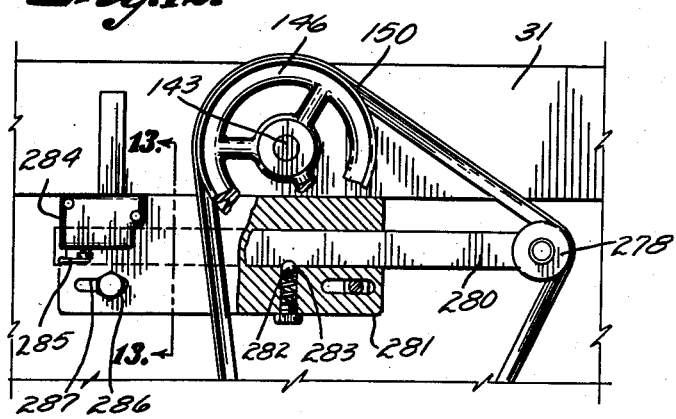
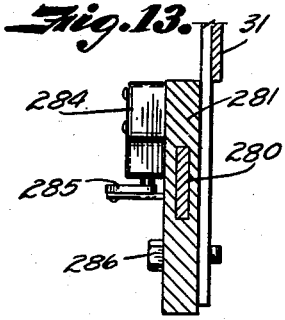
INVENTOR.
Irving M. Archer
BY
Fishburn & Mullendore
ATTORNEYS Patented Apr. 27, 1954

2,676,718

UNITED STATES PATENT OFFICE 2,676,718

MACHINE FOR EMPTYING BREAD AND THE LIKE FROM BAKING PANS

Irving M. Archer, Dallas, Tex., assignor to Campbell Taggart Research Corporation, Dallas, Tex., a corporation of Missouri Application September 22, 1950, Serial No. 186,197

27 Claims. (Cl. 214—308)

This invention relates to a machine for emptying bread and the like from the baking pans as they are discharged from the oven of a commercial bakery, the principal object being to provide a machine capable of handling volume output of such products with the entire operations of emptying the pans, and discharging the loaves of bread and empty pans being automatic.

Other objects of the invention are to provide a machine of this character that is of relatively simple construction, positive in operation and which dumps the bread without damaging the pans or misshaping of the loaves.

A further object of the invention is to provide a machine that is readily adapted to pans of various sizes and number of pans that are strapped together in a unit.

A further object of the invention is to provide a machine readily adaptable to the output of an oven.

In accomplishing these and other objects of the invention hereinafter pointed out, I have provided improved structure the preferred form of which is illustrated in the accompanying drawings wherein:

Fig. 5 is a plan view of the machine with one of the side frames shown in horizontal section.

Fig. 6 is a fragmentary view of the machine, particularly illustrating the mechanism to facilitate turning of the loaves as they are discharged from the pans.

Fig. 7 is a cross-section on the line 7—7 of Fig. 6.

Fig. 11 is a schematic view of the control and safety mechanisms.

Fig. 12 is a fragmentary view of the the main drive and safety switch that is operated thereby for shutting down the machine in case of jamming of a pan or failure of one of the pan operating mechanisms.

Fig. 13 is a section through the switch actuator on the line 13—13 of Fig. 12.

Figure 2:
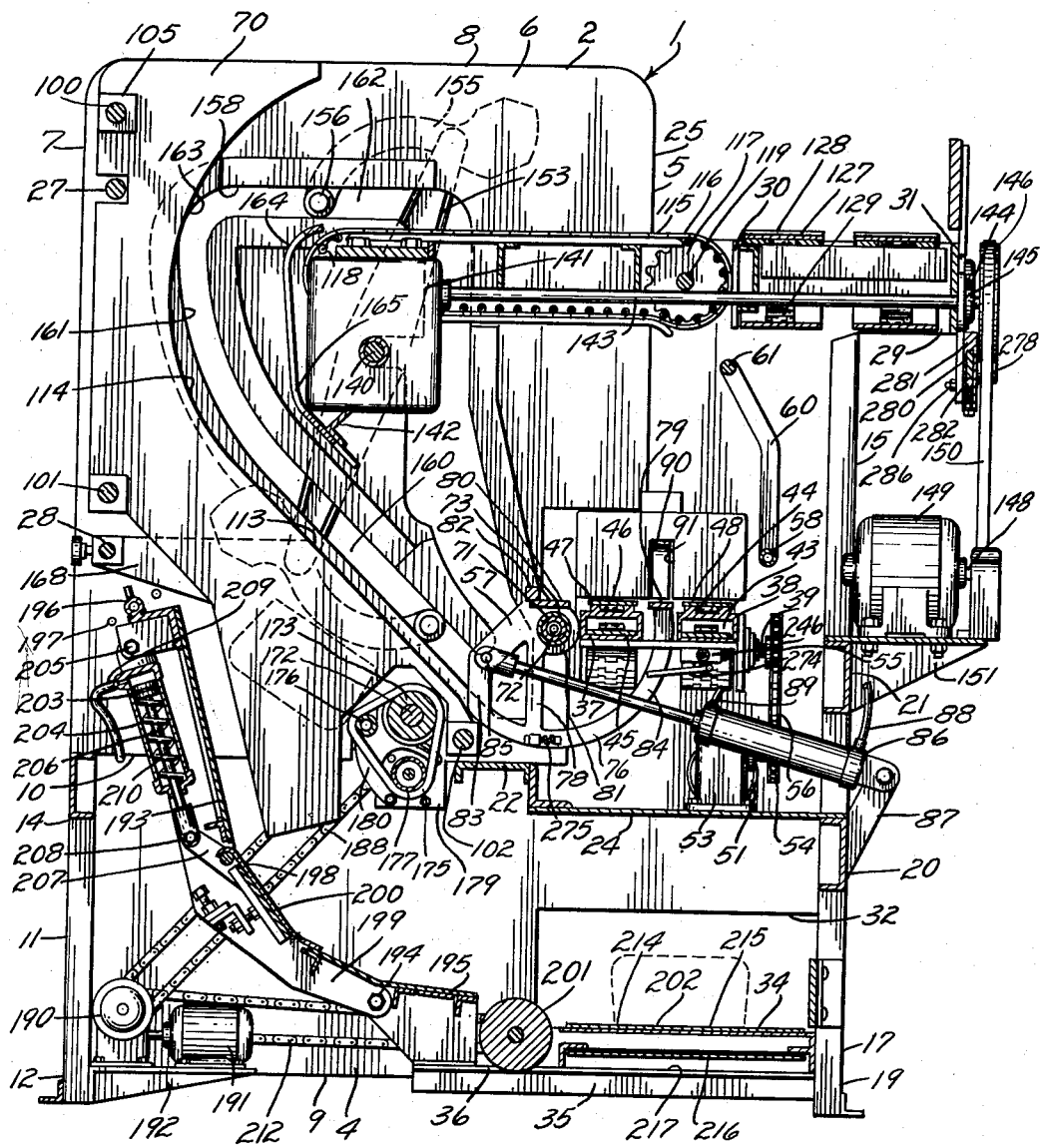
Fig. 2 is a longitudinal section through the machine on the line 2—2 of Fig. 4.
Figure 3:
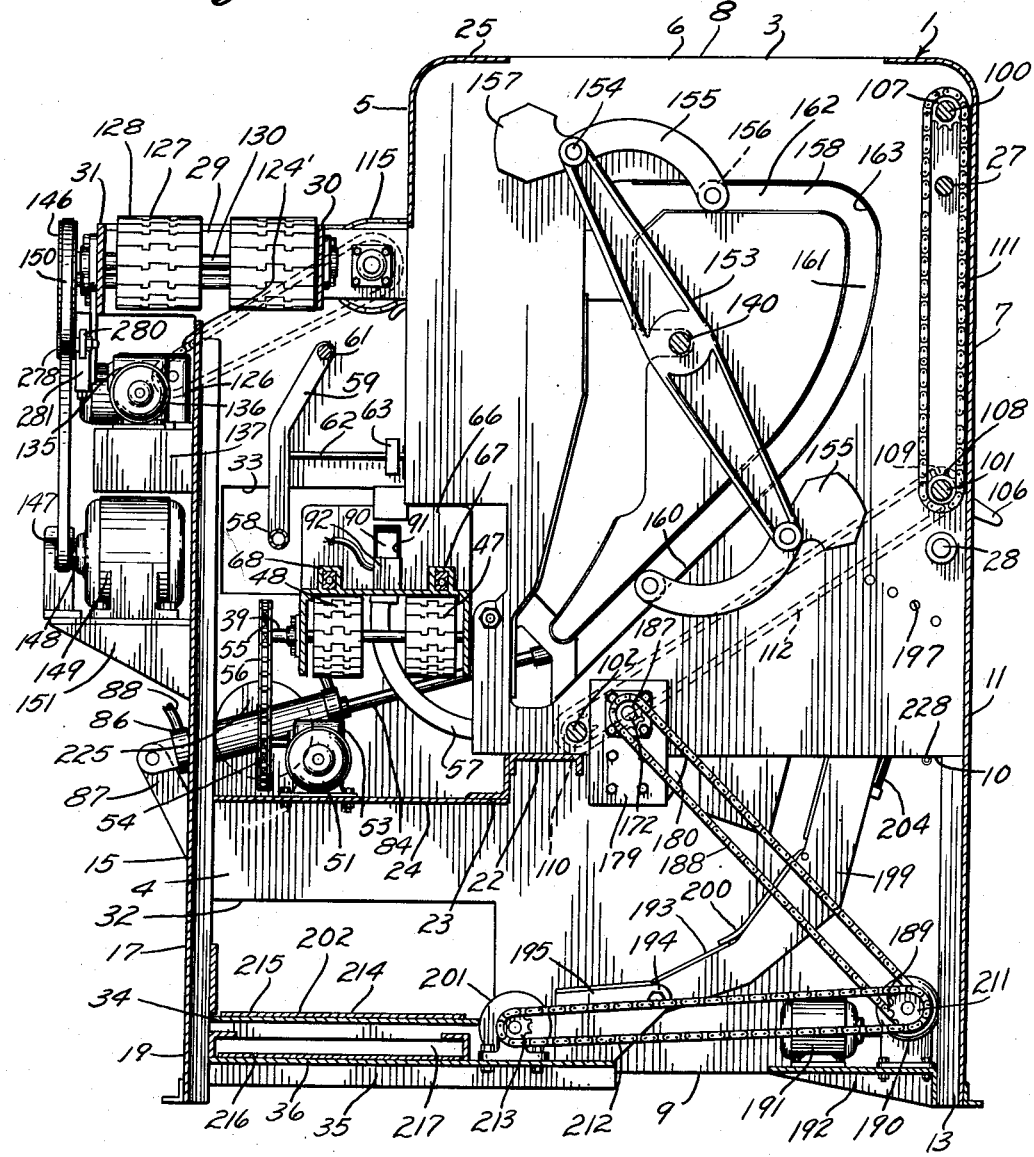
Fig. 3 is a similar section taken on the line 3—3 of Fig. 4.

Referring more in detail to the drawings:

1 designates a machine constructed in accordance with the present invention for emptying bread pans that are discharged by the oven unloader as the pans come out of the oven in a commercial bakery, the pans being conveyed from the oven unloader to the machine 1 by a suitable conveyor (not shown). The machine 1 comprises spaced side frames 2 and 3, each comprising an outer side plate 4 of substantial rectangular shape and having a notched upper corner 5. The side frames also include inner plates 6 that are spaced from the outer plates and extend transversely from the notched corners 5 to the opposite vertical edges 7 of the outer plates 4 and from the upper edges 8 of the outer plates to terminate short of the lower edges 9 of the outer plates as indicated at 10, Fig. 3. The adjacent vertical side edges 7 of the inner and outer plates are connected by webs 11 that project downwardly below the edges 9 to form legs 12 and 13 which are interconnected by a cross bar 14 below the lower edge 10 of the inner plates 6. The opposite vertical edges 15 of the outer plates are connected with vertical channels 16 and 137 forming legs 18 and 19 which are interconnected transversely by cross bars 20 and 21, Figs. 2 and 4. The side frames are also connected by an intermediate cross bar 22 located at the lower edges 10 of the inner plates and which carries an angle 23 cooperating with the cross bar 20 in supporting a platform plate 24. The inner and outer plates of the side frames 2 and 3 are interconnected at the notched portions 5 of the outer plates by webs 25 and 26 as shown in Figs. 2 and 3. The side frames 2 and 3 are also connected above the transverse bar 14 by rods 27 and 28. Also connecting the opposite sides of the side frames 2 and 3 at the lower edges of the notched portions 5 is an outwardly projecting frame 29 including spaced parallel cross bars 30 and 31.

Formed in the outer plates 4 of the side frames are lower elongated rectangular shaped openings 32 and spaced thereabove is a similar opening 33, which openings are arranged transversely. The side frames are interconnected at the horizontal edges of the openings 32 by a horizontal plate 34 and spaced therebelow but carried slightly above the floor level on spaced angles 35 is a platform 36. The angles 35 extend inwardly of the machine to terminate slightly beyond the cross bar 22 as shown in Fig. 2.

Figure 8:
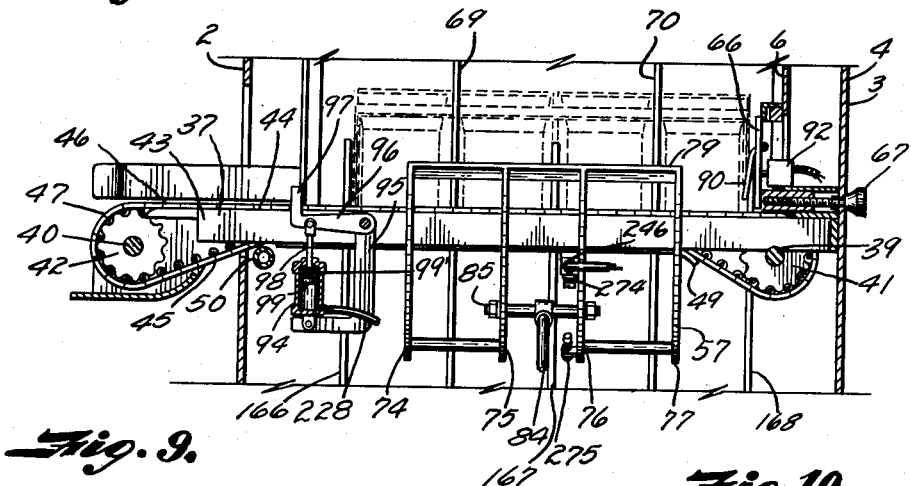
Fig. 8 is a fragmentary vertical section through the machine particularly illustrating the pan inverting mechanism.

Extending transversely between the side frames 2 and 3 and having ends projecting through the opening 33 are spaced rails 37 and 38 carrying shafts 39 and 40 at the respective ends thereof. The shafts 39 and 40 each carry a pair of sprockets 41 and 42. The rails 37 and 38 constitute tubular guides 43 and upper tracks 44 as shown in Fig. 2 to support the lower and upper runs 45 and 46 of chain belts 47 and 48 operating over the pairs of sprockets 41 and 42 to carry the bread pans into the machine. The lower runs 45 of the chains are directed into the tubular guides by inclined lips 49 and out of the guides by rollers 50 as shown in Fig. 8.

Figure 4:
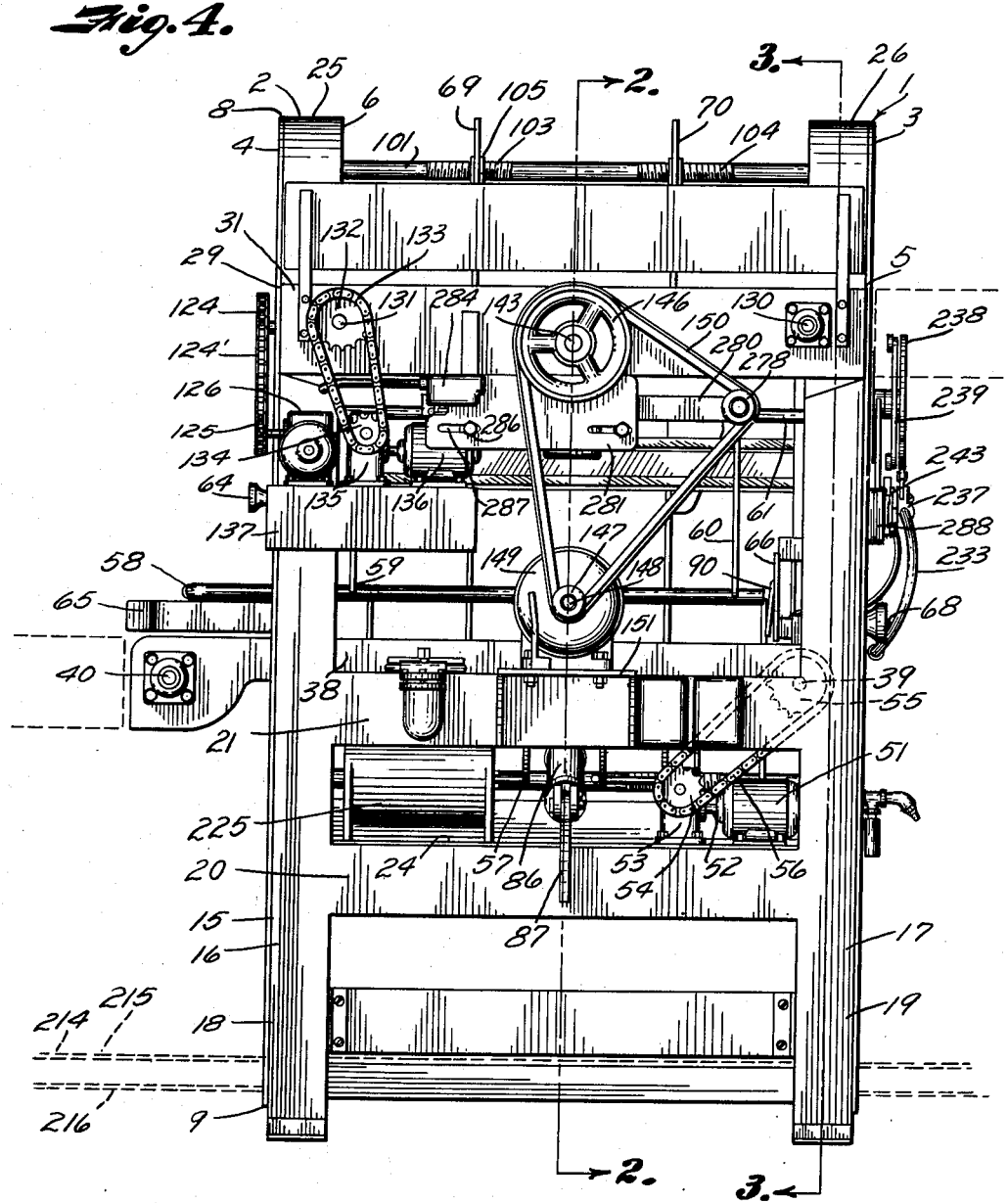
Fig. 4 is an end elevational view of the machine.

The shaft 39 of the conveyor constitutes the driven shaft and is operated by a motor 51 that is positioned on the platform 24 as shown in Fig. 3 and has the armature shaft 52 thereof, connected with a speed reducer 53 also mounted on the platform 24 and which carries a sprocket 54 for driving a sprocket 55 on the conveyor shaft 39 by a chain 56 as best shown in Figs. 3 and 4. The chain belts 47 and 48 are thus driven continuously to carry the pans into the machine and over a pan inverting or dumping device 57, later described. The pans are guided into pan dumping position by an outer guide rail 58 that is supported on arms 59 and 60 depending from a shaft 61. The arms are adapted to be moved to adjustably position the guide bar with respect to the opposite side of the conveyor by a rod 62 that is connected with one of the arms and which is adjustable in a lug 63 by a screw device 64. It is obvious that by adjusting the outer guide rail 58, the ends of the pans of a strapped set may be kept in contact with a fixed guide 65 at the opposite side of the conveyor while the strapped set of pans are being moved into a position relatively to the pan inverting device 57.

The moving pans are stopped in position over the inverting device 57 while the conveyor belts continue to move thereunder. This is effected by an abutment plate 66 that is adjustably supported on the side frame 3 by adjusting screws 67 and 68. With this arrangement, a set of strapped pans are carried into position with the longer dimension of the pans transversely of the conveyor belts, so that when the set of pans is inverted, the loaves of bread fall upside down in side-to-side relation at the side of the innermost conveyor belt. In this operation, the set of pans drop onto the pan guide and support members 69 and 70, later described.

The pan inverter 57 is mounted on a tubular shaft 71 that is supported between the side frames 2 and 3 on a tie rod 72 that is carried by the inner plates 6 thereof. The inverter includes a sleeve 73 oscillatably mounted on the tubular shaft and which carries arcuate arms 74, 75, 76, and 77 that are arranged in spaced-apart relation and connected with the sleeve by spokes 78. The arcuate arms operate between the chains of the conveyor as shown in Fig. 2 and have their free ends connected by a pan lifting bar 79 that cooperates with the bar 80, carried by hub portions 81 of the spokes, to engage under the bottom of the set of pans. The bar 80 also carries a co-extensive strip 82 which engages the ends of the pan and prevents them from sliding off the inverter before the pans are in position to fall therefrom in upside down position, as later described.

The inner arcuate arms 75 and 76 of the inverter include wing portions 83 which project from the spokes 78 and provide lever arms to which a piston rod 84 is connected by means of a pin 85. The piston rod 84 carries a piston (not shown) that is slidably mounted in a cylinder 86 which is pivotally supported on a bracket 87 that projects from the cross bar 20, previously described.

A pressure fluid such as air is admitted to the respective ends of the cylinder 86 through ducts 88 and 89 to effect reciprocation of the piston and rocking movement of the inverter. As each set of pans reach the position to be operated upon by the inverter, the foremost pan in the set engages a lever 90 that is pivotally mounted in a slot 91 of the abutment plate 66, the lever being connected with a switch 92 closing an electric circuit which is connected with a solenoid valve 93 for supplying pressure fluid to an actuating cylinder 94 that is pivotally suspended between the conveyor chains on a bracket 95. The bracket 95 pivotally mounts a lever 96 having a lug 97 that is adapted to be moved into the path of a succeeding set of pans to stop movement thereof until the proceeding set of pans has been completely moved out of the way by the inverter and dropped upon the pan guide supports 69 and 70, previously mentioned. The stop lever 96 is connected with a piston rod 98 with a piston 99 that is slidable in the cylinder 94 as best shown in Fig. 8. The piston is actuated by a spring 99'.

Figure 1:
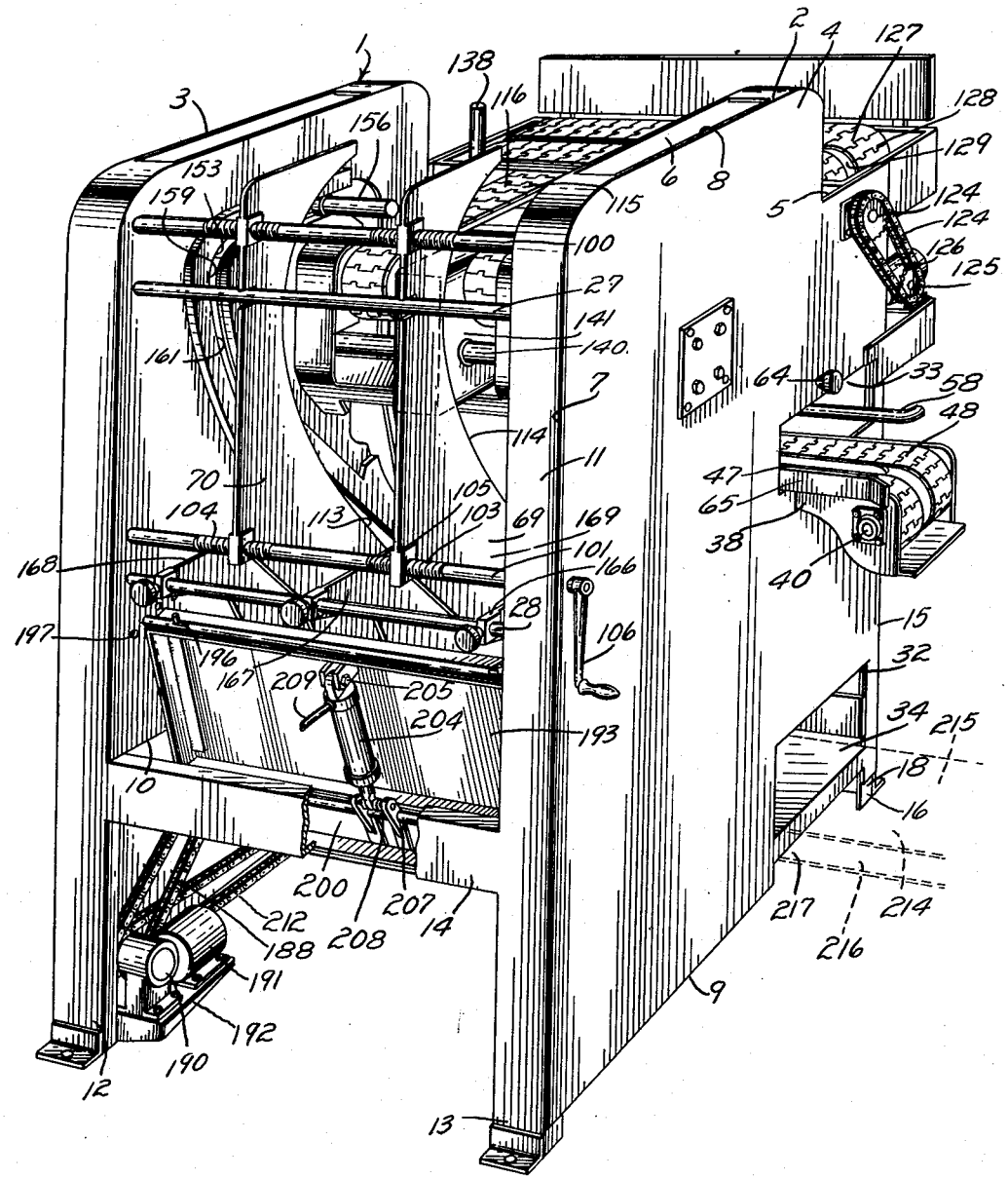
Fig. 1 is a perspective view of a pan emptying machine constructed in accordance with the present invention.

The pan support and guide members 69 and 70 are formed of plate material and are adjustably supported in spaced parallel relation between the side frames as best shown in Fig. 1, on shafts 100, 101, and 102 so that edges of the plates serve as the pan guides. The shafts 100, 101, and 102 each have spaced sets of right and left threads 103 and 104 engaged by internally threaded nuts 105 that are attached to the plate members and through which the threaded shafts extend as best shown in Figs. 1 and 2. The ends of the shafts are suitably journalled in the plates of the side frames 2 and 3 and are operatively connected together so that when a crank 106 on the end of the shaft 101 is turned all of the shafts are rotated to maintain parallel relation of the pan guide plates as they are adjusted according to the spacing between the pans in a strapped set, for example, if four pan sets are used, the guide plates would be adjusted to engage the straps between the first and second pans. The shafts 100 and 101 have related sprockets 107 and 108 and the shafts 101 and 102 have related sprockets 109 and 110. Operating over the respective related sprockets are chains 111 and 112 (see Fig. 3). The guide plates have inclined edges 113 which terminate in upwardly extending arcs 114 for guiding the pans upwardly to a right side up position on an off-take conveyor 115.

The conveyor 115 consists of spaced chains 116 that are carried on pairs of sprockets 117 and 118 which are fixed on shafts 119 and 120 journalled in spaced longitudinal frame members 121 and 122 that are carried in horizontal position from the inner plates 6 by means of brackets 123. The shaft 119 projects through the outer plate of the side frame 2 and carries a sprocket 124 and operating thereover and over a sprocket 125 on a motor driven speed reducer 126 is a chain 124', as best shown in Fig. 1. With this arrangement, the off-take conveyor is driven continuously to discharge the righted pans onto a transverse conveyor 127. The conveyor 127 comprises spaced chain belts 128 that are carried on pairs of sprockets 129 fixed to shafts 130 and 131 journalled at the ends of the cross bars 30 and 31, previously described. The shaft 131 projects from the frame member 31 and carries a sprocket 132 that is driven by a chain 133 operating over a sprocket 134 on a driving unit 135 actuated by a motor 136 which is carried on a bracket 137 as shown in Fig. 4. The conveyor 127 is thus positioned transversely of the conveyor 115 so that the discharge pans may be delivered in either direction depending upon the direction in which chain belts 128 are driven. In order to turn the pans as they are discharged onto the conveyor 127, the chain belts 128 thereof are mounted so that the upper runs operate in a slightly inclined plane whereby a corner of the discharged set of strapped pans is first engaged by the off-take conveyor and caused to turn the discharge pans against a longitudinal guide member 138.

When the pans drop onto the guide plates, the loaves of bread contained therein are jarred loose and drop therefrom.

It sometimes happens that one or all of the loaves in a strapped set of pans tend to hang momentarily before they drop from the pans because of dented or bent pans, uneven greasing, or possibly uneven scaling or proofing of the dough from which the loaves are formed. Therefore, means is provided and timed to allow the pans to rest upon the pan guide plates for as long a time as possible, consistent with the rate of production before they are pushed upwardly along the guides by means of a conveyor mechanism as now described. Extending transversely of the machine and having its ends journalled in suitable bearings 139 on the side frames of the machine is a shaft 140 which is driven by a suitable reduction gearing enclosed in a housing 141 that is suspended between the conveyor chains of the off-take conveyor from a cross bar 142. The power shaft 143 of the speed reduction gearing extends alongside the off-take conveyor and has its outer end journalled in a bearing 144 that is carried by plate 145 suspended from the cross bar 31 as shown in Fig. 2. Fixed to the projecting end of the shaft is a pulley 146 and operating thereover and over a pulley 147 on the armature shaft 148 of a motor 149 is a belt 150. The motor 149 is carried by a bracket 151 fixed to the cross bar 21, previously described.

Mounted on the ends of the shaft 140 between the inner and outer plates of the side frames are arms 152 and 153 each having oppositely directed ends 154 which pivotally mount arcuate links 155 carrying pins 156, the links being counterbalanced by weights 157 to retain the pins 156 in proper position within guide slots 158 and 159 that are formed in the respective inner plates 6 of the side frames 2 and 3. The guide slots include inclined portions 160 that extend parallel along the inclined edges of the pan guide members and which terminate in arcuate portions 161 that follow the curved edges of the guide members and which connect with horizontal portions 162 that are located above the upper run of the off-take conveyor chains as best shown in Fig. 2. The arcuate portions 161 join the horizontal portions by rounding of the slots as indicated at 163.

From the terminal ends of the horizontal portions of the slots, the slots extend downwardly to connect with the inclined portions of the slots as best shown in Figs. 2 and 3. It is obvious that as the arms 152 and 153 rotate in a clockwise direction (Fig. 2), the pins move within the slots to engage the strapped set of pans that has been deposited on the guide members and to push the empty pans upwardly where they are turned about a guide 164 that is supported by suitable brackets 165 above the off-take conveyor.

However, the pins 156 do not travel at the same constant speed as the arms 152 and 153 or links 155 because when the links 155 trail the pins 156 down the vertical portions of the slots, the pins 156 come to dwell in the vertical portions of the slots while the ends of the arms 152 and 153 swing across the arc of their movement or until the ends of the arms 152 and 153 have swung sufficiently past the lower ends of the slots to allow the links 155 to swing downwardly by pivoting on the pin connections thereof with the ends 154 of the arms. The pins then continue their movement to the entrance of the inclined portions of the slots. This delay or dwell of the pins 156 allows plenty of time for the loaves of bread to drop from the pans before the pins 156 move into position for engaging the inverted set of pans. As the pins engage the set of pans, the pans are pushed thereby up the arcuate portions 161 of the slots with the upper portion of the set of pans being directed along the terminal of the arcuate guides until the pans over-balance and drop upon the upper ends of the guides 164. As the pins move upwardly and along the horizontal portions of the slots, the pans are moved onto the off-take conveyor. Continued movement of the arms carries the pins downwardly in the vertical portions of the slots so as to return them to position for engaging a succeeding set of pans that have been moved into position by the pan inverting device, as previously described.

Adjustably mounted on the rod 27 are divider plates 166, 167, and 168 which cooperate with depending extensions 169 of the guide plates to form individual passageways for each loaf of bread as it falls from the pan.

Since the loaves of bread fall upside down, means is provided for turning the loaves as now to be described. Rotatably mounted in suitable bearings 170 and 171 attached to the inner plates of the side frames is a shaft 172 carrying a roller 173 having a series of circumferential spaced grooves 174 for endless belts 175 that operate over rollers 176 and 177. The roller 177 is mounted on a shaft 178 carried by plates 179 bolted to the inner plates of the side frames. The roller 176, however, is carried on brackets 180 and 181 each having arms 182 and 183, one of which is pivotally mounted on the plates by bolt 184 and the other has a slot 185 passing a clamping bolt 186 to retain the roller in adjusted position.

The shaft for the groove roller carries a sprocket 187 that is driven by a chain 188 operating over a sprocket 189 on the power shaft of a speed reduction gear 190 that is actuated by a motor 191 positioned on a bracket 192 carried adjacent the inner side of the leg 12 on the side frame.

The grooved roller 173 is driven in a clockwise direction (Fig. 2) so that the belts 175 engage the ends of the loaves and tend to lift them while the opposite ends of the loaves drop on an inclined chute 193 that is hinged as at 194 to brackets 195 that are carried by the inner end of the angles 35 as best shown in Fig. 2. The chute is held in position by latch bolts 196 engaging in one of a series of openings 197 to adjust the angular position of the chute.

It is obvious that since the loaves do not drop from the pans at the same time, they do not reach their upright position on the chute at the same time. Means is therefore provided to detain the loaves in righted position on the chute to give ample time for the slowly dropping loaves to catch up and laterally align in a row with the faster dropping loaves. All of the loaves from the strapped set of pans may then continue their slide down the chute in a laterally aligned row as now to be described. Pivotally supported on a rod 198 that is carried by the frame work 199 of the chute is a flap 200 which is adapted to raise into the path of the bread sliding down the chute to align all of the loaves so that they will slide in a uniform row over the lower end of the chute and roller 201 onto an off-take conveyor 202.

The flap 200 is operated by a pressure actuated piston 203 that is slidably mounted in a cylinder 204 which is pivotally supported on the chute as indicated at 205. The piston carries a spring loaded piston rod 206 that is connected with an arm 207 on the flap by a pin 208. A fluid pressure medium is admitted to the cylinder to act against the piston 206 through duct 209 to act against and effect movement thereof in opposition to a spring 210 so as to raise the flap in position and momentarily detain the loaves of bread to effect their alignment. When the pressure medium is exhausted to the atmosphere, the spring 210 returns the flap to normal position and allows the loaves of bread to continue their movement onto the off-take conveyor. The roller 201 is driven from the speed reduction gearing 198 by sprocket 211 carrying a chain 212 that operates over a sprocket 213 on the shaft of the roller 201 as best shown in Fig. 3. The bread conveyor 202 preferably comprises an endless belt 214 having an upper run 215 operating through the openings 32 in the side frames over the platform 34, and a lower run 216 operating through notches 217 formed in the lower edges of the outer side plates 4 as shown in Fig. 1.

The pressure cylinders 86, 94, and 204 are supplied with pressure fluid through a pipe 218 having branches 219 and 220 connected with the ducts 88 and 89 supplying the ends of the pan inverter cylinder 93. Connected in the pipes 219 and 220 are pressure regulating valves 221 and 222 having pressure indicating gauges 223 and 224 connected with the discharge sides thereof, whereby differential pressures may be supplied to the respective ducts 88 and 89. Also connected in the duct 88 is a reserve pressure tank 225 for maintaining a substantially constant low pressure against the outer end of the piston in the cylinder 86 to project the piston rod 84 and hold the pan inverter device 57 in retracted position so that a set of strapped pans can be moved thereacross. This pressure acting on the piston is merely sufficient to positively retain the pan inverter in retracted position. The pressure regulator 222, however, is set to maintain a greater pressure on the opposite side of the piston so that when the solenoid valve 226 is opened in the pipe 220, pressure fluid is supplied to the opposite end of the cylinder at greater pressure to effect operation of the pan inverter 57 against the lesser pressure acting on the opposite end of the piston. However, when the solenoid valve 226 is closed and the duct 89 vented to the atmosphere through an exhaust 227, the constant pressure acting through the duct 88 returns the pan inverter 57 to normal position. The cylinder 94 is supplied with pressure fluid from the pipe 218 through a branch pipe 228 having a pressure regulator valve 229 and a pressure gauge 230. Also connected in the pipe 228 is a solenoid valve 93 having an exhaust outlet 232. When the solenoid valve 93 opens, fluid pressure is supplied to the cylinder 94 to effect movement of the piston for raising the stop lever into position for stopping a succeeding set of pans when a proceeding set of pans is over the pan inverter as later described. Also connected with the pipe 218 is a branch pipe 233 that is connected with the flap actuating cylinder 204. This pipe is equipped with a pressure regulating valve 234 and a pressure gauge 235. The pipe is also equipped with a shut-off valve 236 and a cam actuated valve 237 which is under control of the pin carrying arms as later described.

The conveyors and revolving arms which carry the pins are operated continuously when the machine is in use. The pan inverter 57 and bread aligning flap 200 are operated intermittently according to the feeding rate of the pans discharged from the oven. Means is therefore provided to keep these mechanisms in synchronism with movement of the pans by the pin carrying arms, as now to be described.

Mounted on the outer end of the shaft 140 is a cross arm 238 and a cam disk 239. The arm 238 has oppositely directed ends carrying rollers 240 and 241 adapted to engage the actuating arm 242 of a switch 243 to close circuit through a holding coil 244 of a relay switch 245 which controls flow of current to the solenoid valves 226 and 93 and to the switch 92, previously described, and to a holding switch 246 that is actuated by the pan inverter 57 as now to be described.

Current is supplied through line conductors 247 and 248, the conductor 247 being connected with one contact 249 of the relay switch 246 while the conductor 248 is connected with one lead 250 of the holding coil 244. The other lead 251 of the holding coil is connected with one contact 252 of the relay switch while the complementary contact 253 of the relay switch is connected with the other contact 254 of the switch 246 by a conductor 255. The relay contact 252 is also connected by a conductor 256 with a contact 257 of the switch 243. The other contact 258 of the switch 243 is connected by a conductor 259 with one contact 260 of the switch 92 and through the solenoid 231 to the supply conductor 248 by conductors 261 and 262. The other contact 263 of the switch 92 is connected by a conductor 264 with the supply conductor 247. The solenoid valve 226 is supplied with an actuating current through another set of contacts 265 and 266 of the relay switch, the contact 266 being connected with the supply conductor 248 through a branch conductor 267 and the contact 265 is connected to the other supply conductor 247 through the solenoid winding of the valve 226 by conductors 268 and 269. The switch contacts 257 and 258 are closed by a movable contact 270 that is operated by the actuating arm 242. The contacts 265 and 266 and 253 and 252 of the relay switch are closed by movable contacts 271 and 272. The switch contacts 254 and 249 are normally closed by a movable contact 273 which is operated by a lever 274 adapted to be engaged by a spring pressed pin 275 that is mounted on one of the arcuate arms of the pan inverter so that near completion of the movement of the pan inverter, the pin engages the lever 276 to open circuit through the contacts 249 and 254. The contacts 263 and 260 of switch 92 are normally open but are closed on actuation of the pan engaging lever by a movable contact 277, but the inverter cannot operate until the switch 243 is closed by the rollers 240 and 241 on the arm 238 which rotates with the pan moving arms. The dumping of the pans are therefore kept in time with removal of the empty set of pans. Because of the delay required to assure dropping of all the loaves of bread from a set of inverted pans, the timing for closure of the switch 243 by the rollers 240 and 241 is such that a succeeding pan is deposited by the inverter as close as possible to the previously dumped set of pans to maintain the maximum capacity of the machine.

While adequate safety mechanisms are provided, it is possible that a pan could become wedged in the machine due to failure of the control devices. Means is therefore provided for disconnecting the drive of the main motor 149 and opening of the circuit thereof. This is effected by providing an idle pulley 278 which engages the drive belt 150 to hold the belt 150 in taut relation with respect to the driving pulley of the motor 147. The pulley 278 is mounted on a slide bar 280 that is reciprocably supported in a block 281 carrying a spring pressed ball latch 282 engaging in a notch 283 of the bar 280 to hold the bar in extended position. Mounted on the block near the opposite end of the bar is a switch 284 that is connected with the main supply circuit to effect opening thereof in case the pull on the belt should exceed the holding force of the ball latch 282 as in the case of wedging of a pan in the machine, the switch 284 being operably connected with the bar 280 by a lever 285. The block 281 is adjustably mounted on the side frame of the machine by cap screws 286 extending through slots 287 of the bar and into threaded engagement with a part of the frame, as best shown in Figs. 12 and 13.

Figure 9:
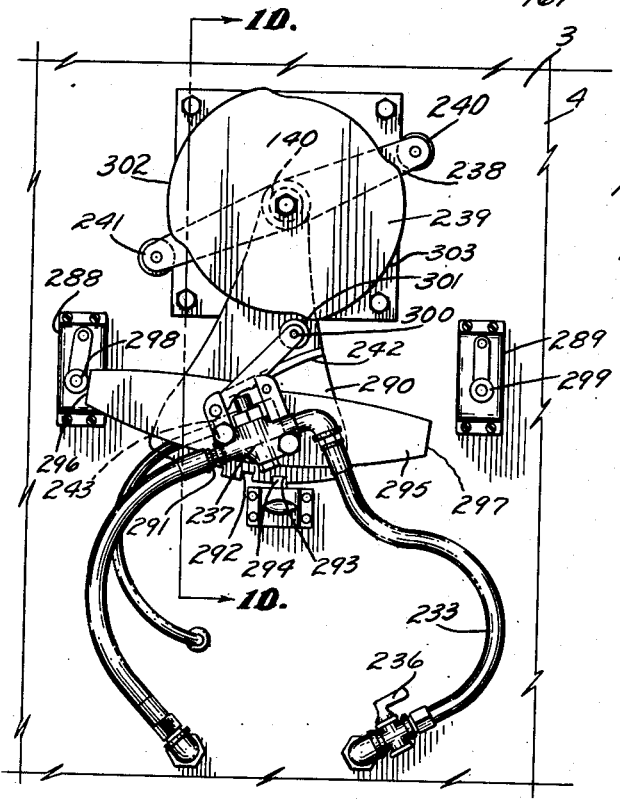
Fig. 9 is a fragmentary view of the machine, particularly illustrating the timing mechanism.
Figure 10:
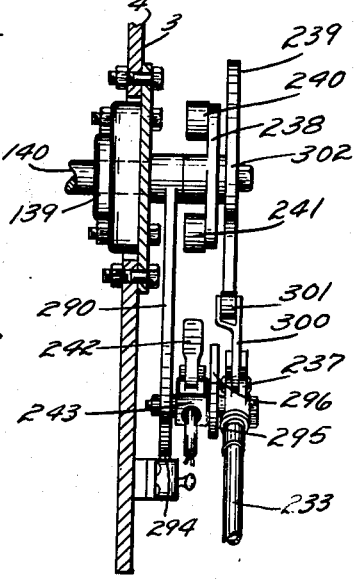
Fig. 10 is a cross-section on the line 10—10 of Fig. 9.

Bread dough is made in batches of from 1,200 to 1,600 pounds in a modern bakery. These doughs are scheduled usually three or four per hour. When the dough is cut into pieces for one pound loaves of bread, obviously, more pieces are had than when the dough is cut into pieces for one and one-half pound loaves of bread. This relationship means that during certain times of the day more loaves of bread per minute must be handled than at other times. To take care of the fluctuating production, the motor 149 actuating the pan carrying arms of the bread dumping machine is a multiple speed motor, for example, a motor having two speeds. The motor is therefore controlled by a high speed switch 288 and a low speed switch 289 which are alternately operated by an arm 290 loosely supported on the shaft 140 and having an arcuate lower edge provided with notches 291, 292, and 293 adapted to be engaged by a manually actuated bolt 294. Carried by the depending arm 290 is a cross member 295 having ends 296 and 297 adapted to respectively engage the actuating levers 298 and 299 of the respective switches 288 and 289 depending upon which of the notches is engaged by the bolt 294. For example, when the bolt 294 is engaging the notch 293, the motor is actuated at high speed and when engaging the opposite notch 291, the motor is operated at low speed or when the bolt engages the intermediate notch 292, the motor circuit is open. The cam actuated valve 237 is carried on the depending arm 290 and has an actuating lever 300 provided with a roller 301 for engaging opposite diametrically arranged high lobes 302 and 303 on the cam disk 239 as best shown in Figs. 9 and 10. With this arrangement, positioning of the arm so as to close the high or low speed switches also positions the actuating roller of the valve relatively to the high lobes of the cam.

In moving from low speed to high speed, changing of the position of the switch 243 is of greatest importance. The pan turnover is effected at approximately the same speed regardless of the speed of the arms 252 and 253. This is desirable so as to not vary the dumping shock, it being obvious that if the speed of the pan inverter is increased with the speed of the arms 252 and 253, the force with which the pans strike the guides would be increased. With the present arrangement, the pans will move out of the way of a turning pan and up the guide tracks with greater rapidity when the pan is operated at high speed than in low speed. Thus, the pans should be further along the guides when the pan turnover movement is initiated during low speed operation than during high speed operation to clear the pans. Mounting of the switch on the speed changing arm 290 automatically changes relation of the time that the switch is operated relatively to position of the pan moving pins when a speed change is effected. Therefore, the pans are caused to drop close behind the preceding set of pans at either of the selected speeds which allows for maximum time for the loaves to be discharged at either speed with a constant speed of the inverting mechanism.

Assuming that the machine constructed as described is installed in a bakery, the operation is as follows. Bread pans as they come out of the oven are fed onto the chain belts 47 and 48 which carry the pans in successive order over the pan inverting device 57. As soon as the foremost pan is in position, the forward pan has engaged the back stop 66 and has actuated the lever 90 to close circuit through the switch 92. Switch 243 is closed by either roller 240 or 241 on rotating arm 238 to send an impulse through the coil 244 to effect closing circuit through the contacts 253 and 252 and 265 and 266. As soon as the contacts 252 and 253 of the relay switch are closed, the circuits remain closed until they are opened responsive to completion of movement of the pan inverting device. Current is then flowing through the solenoid winding of the valves 93 and 226 so as to cause the stop lever 96 to move into position for holding a succeeding set of pans while the inverting device is in operation. Opening of the valve 226 allows pressure medium to flow to the cylinder 86 to actuate the pan inverter which turns the set of pans thereon in upside down position onto the inclined portions 113 of the pan supporting and guide plates 69 and 70. As soon as the pan is cleared, the actuating arm for the switch 92 will open the switch but the circuit remains closed by reason of the current flowing through the holding coil of the relay switch. However, as soon as the pan inverter has dumped the set of pans, the pin 275 contacts the arm 274 and opens the holding switch 254, thereby opening the circuit to permit opening of the valves 93 and 226 so as to exhaust the pressure medium from the respective cylinders 86 and 94, the stop lever 96 being returned to its normal position by reason of the spring 99' and the pan inverter being returned to its original position by the air pressure acting in the cylinder 86 through the pipe 88. The succeeding pan then moves into position but the inverter cannot be operated until the dumped pan has been moved out of position by the pan carrying arms 153 and the arm 238 is in position to again close the switch 243. The jar of the pans striking the supporting plates causes the loaves of bread to drop into the chute between the respective guide plates. As the bread begins to fall upside down, the ends thereof are engaged by the belts 175 to cause turning of the loaves whereby they drop with the bottoms thereof on the surface of the chute. A high lobe of the cam 239 has now moved into position to open the valve 237 for admitting pressure medium to the cylinder 204 which moves the flap 200 across the path of the loaves of bread so that they are momentarily detained and aligned to continue movement along the chute in a row. When the high lobe of the cam disk 239 runs off the roller 301, the valve 237 closes and the pressure medium is exhausted from the cylinder 204 so that the spring therein returns the flap to its normal position, as shown in Fig. 2, which releases the loaves of bread for gravital movement across the feed rollers 201 and onto the bread discharge conveyor.

As above stated, bread dough is made of batches of from 1200 to 1600 pounds in a modern bakery and these doughs are scheduled usually three or four per hour. When the dough is cut into pieces for one pound loaves of bread, obviously more pieces are had than when the dough is cut into pieces for one and one-half pound loaves of bread. Therefore, when one size loaves have been run and another size is to be baked, the dumping machine must be readjusted to take care of the different number of pans to be handled and to change the position of various parts to accommodate different sized pans or the number of pans included in the strapped sets. The variation in the capacity of the machine is readily adjusted by changing the position of the arm 280 so that the circuit to the main motor is established for operating the motor at the required speed. This is effected by releasing the bolt 294 and shifting the arm so that the bolt engages the proper notch 291 or 293. The machine may be adjusted to the size of the pans by turning the crank 106 which changes the position of the pan supporting and guide plates 69 and 70. If narrower pans with the same number in a set are used but are of smaller size, the crank will be rotated in a direction to move the plates 69 and 70 closer together. After this adjustment, the plates 166 and 168 are adjusted relatively to the plates 69 and 70. This is effected by releasing the clamp screws and sliding the plates along the rod 23. If a different number of pans are used in a strapped set, then the plates 69 and 70 are adjusted to properly support the inverted pans. For example, if a set of three pans is used, the plates 69 and 70 are adjusted to engage the straps of the pans at the sides of the inner pan. With this adjustment, the center dividers 167 may be moved into engagement with either one or the other plates 69 and 70 since it is not needed. The other dividers 166 and 168, however, are adjusted to bring them into position for forming guides to retain the outer loaves of bread in proper position on the discharge chute. With this arrangement, the loaves of bread are prevented from rolling and turning sidewise on the chute and are kept in straight alignment in their longitudinal direction. Plate 66 is moved by means of adjusting screws 67 and 68 so as to stop the pan to be turned over in position to be caught on the guide plates exactly between the pans and on the pan connecting straps.

From the foregoing it is obvious that I have provided a pan dumping machine that is relatively simple in construction and which is completely automatic in handling and dumping the pans and removing the loaves of bread to an off-take conveyor.

What I claim and desire to secure by Letters Patent is:

1. In a machine of the character described, the combination of a pan inverter, a conveyor for delivering pans to the inverter, means in receiving relation with the pan inverter for receiving and supporting the inverted pans to permit contents of the pans to drop therefrom, a pan discharge conveyor above the level of the pan inverter, movable means having a generally upward travel from the pan supporting means for carrying the inverted pans bodily from said supporting means to the level of the pan-discharging conveyor and terminating in a generally horizontal travel for depositing the pans in upright position on the discharge conveyor, and means for actuating said movable means.

2. In a machine of the character described, the combination of a pan inverter, a conveyor for delivering strapped sets of pans to the inverter, means in receiving relation with the pan inverter for receiving and supporting the inverted pans to permit contents of the pans to drop therefrom, a discharge conveyor above the level of the pan inverter for removing the empty sets of pans, movable means for elevating the inverted pans bodily from said supporting means and for depositing the pans in upright position onto the discharge conveyor, means for effecting actuation of the pan inverter responsive to movement of a set of pans into position over the inverter by the delivery conveyor, and adjusting means for said actuating means of said movable pan-elevating means for operating said movable means in accordance with delivery rate of the pans by said first-named conveyor.

3. In a machine of the character described, the combination of a pan inverter, a conveyor for delivering pans to the inverter, means in receiving relation with the pan inverter for receiving and supporting the inverted pans to permit contents of the pans to drop therefrom, a pan removing conveyor, pan-elevating and turning means separate from said supporting means for carrying the inverted pans from said supporting means and for depositing the pans in upright position on the pan removing conveyor, and means for effecting actuation of the pan inverter responsive to movement of a set of pans into position over the inverter by the delivery conveyor, said last-named means being effective responsive to movement of said pan elevating and turning means.

4. In a machine of the character described, the combination of a pan inverter, a conveyor for delivering sets of pans of bread through a fixed path to the inverter, means in receiving relation with the pan inverter for supporting inverted pans while the bread drops from the pans, means for actuating the pan inverter responsive to movement of a set of pans into position over the inverter, means in the path of the delivery conveyor for stopping movement of a following set of pans while the pan inverter is in motion, a pan discharge conveyor at a higher level than the pan inverter, and pan-elevating and turning means between the pan inverter and the pan discharge conveyor for carrying and simultaneously turning the pans while being carried from said supporting means to said discharge conveyor.

5. In a machine of the character described, the combination of a pan inverter, a conveyor for delivering sets of pans of bread through a fixed path to the inverter, means in receiving relation with the pan inverter for supporting inverted pans while the bread drops from the pans, means for actuating the pan inverter responsive to movement of a set of pans into position over the inverter, means in the path of the pans for stopping movement of a following set of pans while the pan inverter is in motion, a pan discharge conveyor, pan-elevating and turning means for carrying the pans from said supporting means and for depositing the pans in upright position on said discharge conveyor, and means responsive to movement of said pan elevating and turning means for timing movement of the pan inverter.

6. In a machine of the character described, the combination of a bread pan inverter, a conveyor for delivering pans of bread to the inverter, means in receiving relation with the pan inverter for receiving and supporting the inverted pans to permit the loaves of bread to drop therefrom, movable means in the path of the loaves of bread and having support for movement in a direction opposite to dropping of the bread to lift ends of the loaves of bread as they drop for turning the loaves, a bread discharge conveyor, means for directing the bread loaves in erect position onto the bread discharge conveyor, and means for removing empty pans from said receiving and supporting means.

7. In a machine of the character described, the combination of a pan inverter for inverting sets of bread pans, a conveyor for delivering the sets of pans to the inverter in successive order, means in receiving relation with the pan inverter for receiving and supporting the sets of pans to permit the loaves of bread to drop therefrom, a bread discharge conveyor located below said pan receiving and supporting means, means in the path of the dropped loaves of bread for turning said loaves, a flap having movement into and out of the path of the turned loaves of bread to align the loaves in rows, means for directing the loaves of bread in said rows to the bread discharge conveyor, and means for removing the empty sets of pans from the pan receiving and supporting means, actuating means for said flap and means responsive to said empty pan removing means for controlling said actuating means.

8. In a machine of the character described, the combination of a pan inverter, a conveyor for delivering pans to the inverter, means in receiving relation with the pan inverter for receiving and supporting the inverted pans to permit loaves of bread to drop therefrom, a bread discharge conveyor below the pan receiving and supporting means, a chute in the path of the falling loaves, spaced rollers carrying a plurality of endless belts for engagement by ends of said loaves, means for actuating said belts to cooperate with the chute in turning said loaves to an upright position as they fall in said chute, means in said chute for aligning the bread to continue along said chute in aligned rows to the bread discharge conveyor, and means for removing the empty pans.

9. In a machine of the character described, the combination of a pan inverter, a conveyor for delivering pans of bread through a fixed path to the inverter, means in receiving relation with the pan inverter for supporting inverted pans while the bread drops from the pans, means for actuating the pan inverter responsive to movement of a set of pans into position over the inverter, means in the path of the pans for stopping movement of a following set of pans while the pan inverter is in motion, a pan discharge conveyor, means for carrying the pans from said supporting means to said discharge conveyor, means responsive to movement of said pan carrying means for timing movement of the pan inverter, a chute located below the pan supporting means for receiving loaves discharged from the pans, a flap in said chute to align the loaves of bread dropped from the pans, and means controlling actuation of the flap responsive to movement of the pan carrying means.

10. A machine of the character described including spaced side frames, a pan inverter supported by the side frames, a conveyor for moving sets of pans to the pan inverter, spaced pan support and guide plates carried between the side frames for receiving pans from the pan inverter, a pan discharge conveyor carried by the side frames above the delivery conveyor, a transverse shaft supported by the side frames, arms carried on the shaft, pan engaging pins movably carried by ends of the arms, means on the side frames for guiding movement of the pins into engagement with an inverted set of pans on said supporting means and for moving the pans up said guide plates and turning the pans onto the delivery conveyor, and means for removing the bread dropped from said pans.

11. A machine of the character described including spaced side frames, a pan inverter supported by the side frames, a conveyor for moving sets of pans to the pan inverter, spaced pan support and guide plates carried between the side frames for receiving pans from the pan inverter, a pan discharge conveyor carried by the side frames above the delivery conveyor, a transverse shaft supported by the side frames, arms carried on the shaft, pan engaging pins movably carried by ends of the arms, means on the side frames for guiding movement of the pins into engagement with an inverted set of pans on said supporting means and for moving the pans up said guide plates and turning of the pans onto the delivery conveyor, a bread chute supported by the side frames, means adjustably supporting said plates in spaced relation between the side frames for guiding the loaves of bread for movement along said chute, a flap movably supported at lower terminals of the guide plates for momentarily stopping movement of the bread in said chute, means for releasing the flap responsive to movement of said pan carrying pins, and means between the pan supporting means and chute for turning the loaves of bread when moving through said chute.

12. A machine of the character described including spaced side frames, a pan inverter supported by the side frames, a conveyor for moving sets of pans to the pan inverter, spaced pan support and guide plates carried between the side frames for receiving pans from the pan inverter, a pan discharge conveyor carried by the side frames above the delivery conveyor, a transverse shaft supported by the side frames, arms carried on the shaft, pan engaging pins movably carried by ends of the arms, means on the side frames for guiding movement of the pins into engagement with an inverted set of pans on said supporting means and for moving the pans up said guide plates and turning of the pans onto the delivery conveyor, a bread chute supported by the side frames, means adjustably supporting said plates in spaced relation between the side frames for guiding the loaves of bread for movement along said chute, a flap movably supported at lower terminals of the guide plates for momentarily stopping movement of the bread in said chute, means for releasing the flap responsive to movement of said pan carrying pins, means between the pan supporting means and chute for turning the loaves of bread when moving through said chute, and secondary guide plates adjustably supported from the side frames to cooperate with the terminals of the pan guide plates in separating the loaves as they slide down the chute to said flap.

13. In a machine of the character described, spaced side frames, shafts having ends journalled in the side frames and having right and left threads, pan supporting plates having inclined edges for supporting a set of strapped bread pans in inverted position whereby loaves of bread fall from the pans between said plates, said inclined edges terminating in upwardly and forwardly curving guide tracks, a transverse shaft journalled in the side frames, arms fixed to said shaft near the ends thereof, links having pivotal support on ends of the arms, pins on the links for engaging undersides of the strapped pans to lift the pans along said guide tracks to turn the pans, said side frames having slot-like tracks for guiding the pins upon revolution of said arms, weights on said links to control movement of the pins in said slot relative to movement of the arms, an offtake conveyor between the side frames for receiving the strapped pans, and means connecting said threaded shafts to effect rotation thereof for adjusting position of the plates relative to the pans in said strapped sets.

14. In a machine of the character described, spaced side frames, a downwardly and forwardly curving chute, a bread offtake conveyor at the forward end of said chute, means for pivotally connecting the forward end of the chute to the side frames, rotary means having support by the side frames above said chute to cooperate with the chute for turning loaves of bread that are adapted to be dropped into the chute, the latch means carried by the chute and adapted to engage one of a series of openings in the side frames to support the upper end of the chute in adjusted spaced relation with said rotary means.

15. In a machine of the character described, spaced side frames, a downwardly and forwardly curving chute, a bread offtake conveyor at the forward end of said chute, means for pivotally connecting the forward end of the chute to the side frames, rotary means having support by the side frames above said chute to cooperate with the chute for turning loaves of bread that are adapted to be dropped into the chute, latch means carried by the chute and adapted to engage one of a series of openings in the side frames to support the upper end of the chute in adjusted spaced relation with said rotary means, and dividers carried by the side frames to provide separate slides for the loaves of bread on said chute.

16. In a machine of the character described, spaced side frames, a downwardly and forwardly curving chute, a bread offtake conveyor at the forward end of said chute, means for pivotally connecting the forward end of the chute to the side frames, rotary means having support by the side frames above said chute to cooperate with the chute for turning loaves of bread that are adapted to be dropped into the chute, latch means carried by the chute and adapted to engage one of a series of openings in the side frames to support the upper end of the chute in adjusted spaced relation with said rotary means, dividers carried by the side frames to provide separate slides for the loaves of bread on said chute, a flap carried by the chute and movable into and out of the path of said loaves to momentarily detain and release the loaves for causing the loaves to slide from the chute onto the offtake conveyor in a row, and means for actuating said flap.

17. In a machine of the character described, the combination of a pan inverter, a conveyor for delivering pans of bread through a fixed path to the inverter, means in receiving relation with the pan inverter for supporting inverted pans while the bread drops from the pans, means for actuating the pan inverter responsive to movement of a set of pans into position over the inverter, means in the path of the pans for stopping movement of a following set of pans while the pan inverter is in motion, a pan discharge conveyor above the inverter, means for carrying the pans from said supporting means to said discharge conveyor, and a conveyor above and substantially parallel with the delivery conveyor for receiving the pans from the discharge conveyor, said last named conveyor being tilted relatively to the discharge conveyor to effect turning of the pans.

18. In a bread pan dumping machine, pan supporting means, means for inverting pans over said supporting means, a shaft, arms carried by the shaft, links pivoted on the ends of the arms, pins carried by the links and projecting into position for engaging the pans on said supporting means, means for guiding said pins having slot-like passages for passing the pins to remove the pans from the supporting means upon engagement of the pins with said pans, and means for continuously operating the shaft, said guide means having portions cooperating with the links for effecting dwell of the pins prior to contact of the pins with said pans.

19. In a bread pan dumping machine, pan supporting means, means for inverting pans over said supporting means, a shaft, arms carried by the shaft, links pivoted on the ends of the arms, pins carried by the links and projecting into position for engaging the pans on said supporting means, means for guiding said pins having slot-like passages for passing the pins to remove the pans from the supporting means upon engagement of the pins with said pans, means for continuously operating the shaft, said guide means having portions cooperating with the links for effecting dwell of the pins prior to contact of the pins with said pans, and means actuated by said shaft for effecting actuation of the pan inverting means.

20. In a bread pan dumping machine, pan supporting means, means for inverting pans over said supporting means, a shaft, arms carried by the shaft, links pivoted on the ends of the arms, pins carried by the links and projecting into position for engaging the pans on said supporting means, means for guiding said pins having slot-like passages for passing the pins to remove the pans from the supporting means upon engagement of the pins with said pans, means for continuously operating the shaft, said guide means having portions cooperating with the links for effecting dwell of the pins prior to contact of the pins with said pans, means for actuating the pan inverting means, and means for changing speed of the shaft while maintaining constant speed of the actuating means for the pan inverter.

21. In a bread pan dumping machine, pan supporting means, means for inverting pans over said supporting means, a shaft, arms carried by the shaft, links pivoted on the ends of the arms, pins carried by the links and projecting into position for engaging the pans on said supporting means, means for guiding said pins having slot-like passages for passing the pins to remove the pans from the supporting means upon engagement of the pins with said pans, means for continuously operating the shaft, said guide means having portions cooperating with the links for effecting dwell of the pins prior to contact of the pins with said pans, means for changing speed of the shaft, means for actuating the pan inverting means at a constant speed, and means on the shaft for timing operation of the actuating means for the pan inverter, said timing means being changeable in response to change in speed of said shaft.

22. In a bread pan dumping machine, pan supporting means, means for inverting pans over said supporting means, pan removing means for moving pans from the supporting means, means for changing speed of the pan removing means, means for actuating the pan inverting means at a constant speed, and timing means actuated by the pan removing means for timing operation of the pan inverting means.

23. In a bread pan dumping machine, a conveyor for delivering pans, pan supporting means in receiving relation with said delivery conveyor, means for inverting pans over said supporting means, pan removing means for moving pans from the supporting means, means for changing speed of the pan removing means relatively to the speed of said pan delivering conveyor, means for actuating the pan inverting means at a constant speed, and timing means for timing operation of the pan inverting means, said timing means being under control of said speed changing means.

24. In a machine of the character described, a pan inverter, a conveyor for delivering pans to the inverter, pan supporting means in receiving relation with the pan inverter for receiving and supporting the inverted pans to permit contents of the pans to drop therefrom, a pan discharge conveyor above the pan inverter, said pan supporting means having track portions leading from the inverter to said discharge conveyor, and pan elevating and turning means movable along said track portions to engage and lift the pans from said supporting means and carry the pans upwardly along the track portions into a right side up position on the pan discharge conveyor.

25. In a machine of the character described, a pan inverter, a conveyor for delivering pans to the inverter, pan supporting means in receiving relation with the pan inverter for receiving and supporting the inverted pans to permit contents of the pans to drop therefrom, a pan discharge conveyor above the pan inverter, said pan supporting means having track portions leading from the inverter to said discharge conveyor, pan elevating means movable along said track portions to lift the pans from said supporting means and carry the pans to a right side up position on the pan discharge conveyor, said pan elevating means including upwardly inclined guideways terminating in substantially horizontal portions extending substantially horizontal at opposite sides of the pan discharge conveyor and terminating in portions connected with said upwardly inclined guideways at the sides of said pan inverter, and pins movable in said guideways for engaging the pans.

26. In a machine of the character described, the combination of a pan inverter, a conveyor for delivering pans to the inverter, means in receiving relation with the pan inverter for receiving and supporting the pans inverted by said inverter to permit contents of the pans to drop therefrom, a pan discharge conveyor above the level of the pan inverter, pan guide means curving from said receiving and supporting means retractively over said discharge conveyor, movable means having a generally upward travel along said guide means from the pan receiving and supporting means for carrying the inverted pans from said receiving and supporting means in guided relation with said guide means for turning the pans during the movement along said guide means to an upright position and for depositing the uprighted pans on to the discharge conveyor, and means for actuating said movable means.

27. In a machine of the character described, the combination of a pan inverter, a conveyor for delivering pans to the inverter, means in receiving relation with the pan inverter for receiving and supporting the pans inverted by said inverter to permit contents of the pans to drop therefrom, a pan discharge conveyor above the level of the pan inverter, pan guide means curving from said receiving and supporting means retractively over said discharge conveyor, movable means having a generally upward travel along said guide means from the pan receiving and supporting means for carrying the inverted pans from said receiving and supporting means while guided by said guide means for turning the pans during the movement along said guide means to an upright position and for depositing the uprighted pans on to the discharge conveyor, means for effecting actuation of the pan inverter responsive to movement of the pans into a position over the inverter by the delivery conveyor, and means for actuating said movable means in accordance with the delivery rate of the pans by said first named conveyor.

References Cited in the file of this patent

UNITED STATES PATENTS

| Number | Name | Date |
|---|---|---|
| 1,702,901 | Hungerford | Feb. 19, 1929 |
| 2,462,021 | Harker | Feb. 15, 1949 |
| 2,609,944 | Nicoletti | Sept. 9, 1952 |
| 2,612,277 | Verrinder | Sept. 30, 1952 |